United States Patent
Weber et al.

(10) Patent No.: US 6,193,925 B1
(45) Date of Patent: Feb. 27, 2001

(54) METHOD FOR APPLYING LABELS TO BLOW-MOLDED ARTICLES

(75) Inventors: Lawrence H. Weber, Ypsilanti; David M. Johnson, Saline, both of MI (US)

(73) Assignee: UNOVA-R & B Machines Tool Co., Warren, MI (US)

( * ) Notice: Subject to any disclaimer, the term of this patent is extended or adjusted under 35 U.S.C. 154(b) by 0 days.

(21) Appl. No.: 09/115,486

(22) Filed: Jul. 14, 1998

Related U.S. Application Data

(60) Division of application No. 08/858,927, filed on May 19, 1997, now Pat. No. 5,919,498, which is a continuation-in-part of application No. 08/567,778, filed on Dec. 5, 1995, now Pat. No. 5,665,404.

(51) Int. Cl.[7] .................................................. B29C 49/06
(52) U.S. Cl. .......................... 264/509; 264/538; 264/543; 425/503; 425/504; 425/522; 425/538; 425/540
(58) Field of Search ..................... 264/509, 538, 264/543; 425/503, 504, 522, 538, 540

(56) References Cited

U.S. PATENT DOCUMENTS

| | | | |
|---|---|---|---|
| 3,555,598 | * | 1/1971 | Mehnert ..................... 18/5 |
| 4,397,625 | * | 8/1983 | Hellmer et al. ............... 264/509 |
| 4,439,127 | * | 3/1984 | Frohn ........................ 425/155 |
| 4,540,460 | * | 9/1985 | Bloomquist et al. ........... 264/509 |
| 4,549,863 | * | 10/1985 | Bourgeois .................. 425/126 R |
| 4,801,260 | * | 1/1989 | Oles et al. ................. 425/527 |
| 4,909,723 | * | 3/1990 | Slat et al. .................. 425/503 |
| 4,954,070 | * | 9/1990 | Dunlap ....................... 425/503 |
| 5,753,278 | * | 5/1998 | Aguilar ...................... 264/509 |
| 5,855,838 | * | 1/1999 | Weber et al. ................. 264/509 |

* cited by examiner

*Primary Examiner*—Jan H. Silbaugh
*Assistant Examiner*—Suzanne E. McDowell
(74) *Attorney, Agent, or Firm*—Reising, Ethington, Barnes, Kisselle, Learman & McCulloch PC

(57) ABSTRACT

A method and an apparatus are provided for inserting labels into blow-molded hollow articles. The blow-molding apparatus includes a carrousel mounted to rotate within a support frame. The carrousel carries four multi-cavity molds around a circular mold path. Two blow-molding workstations are disposed next to the mold path in fixed positions relative to the frame. The carrousel is indexed to cause each mold to pause by each workstation, and at a label-insertion station, one time during each carrousel revolution. An in-mold labeler inserts a label into each mold at the label-insertion station. The in-mold labeler includes four picker heads supported on a carriage that shuttles the heads between label dispensing magazines and the mold station path. Each magazine includes a label stack receptacle in which labels rest edgewise, by gravitational force on a pair of label guide surfaces. Each picker head releasably grasps labels from a label magazine and deposits the labels into open mold cavities at the label-insertion station. Each magazine is translationally and rotationally adjustable to control label orientation in the mold cavities.

14 Claims, 10 Drawing Sheets

METHOD FOR APPLYING LABELS TO BLOW-MOLDED ARTICLES

This application is a division of U.S. patent application Ser. No. 08/858,927 filed May 19, 1997, now U.S. Pat. No. 5,919,498, which is a continuation in part of U.S. patent application Ser. No. 08/567,778 filed Dec. 5, 1995 now U.S. Pat. No. 5,665,404.

TECHNICAL FIELD

This invention relates generally to rotary blow-molding machines and, more particularly, to in-mold labelers (IMLs) for rotary blow-molding machines.

BACKGROUND OF THE INVENTION

Current blow-molding machinery is designed to manufacture hollow plastic containers by extruding a parison between opposed, parted mold halves. The mold is then closed and air is injected into the parison, blowing and distending it outward so that it conforms itself to the inner contours of the mold which match the outer shape of the bottle to be produced. The newly formed container is allowed to harden, then is extracted or dropped from the mold.

Some plastic bottle manufacturers produce blow-molded articles by using rotary blow-molding machines. A typical rotary blow-molding machine includes a rotating carrousel that carries two or more mold stations around a circular mold station path. Each mold station includes a mold with a mold cavity. The carrousel is indexed to hold each mold station momentarily motionless at each of a series of blow molding "workstations". As used in the specification and claims, a "workstation" is defined as a position where each mold station must pause in its circular path for a particular operation to be carried out. A "workstation series" is defined as a progression of workstations necessary to complete a blow molding process on a single mold station in a single carrousel revolution. Blow molding operations are carried out sequentially on each mold as each mold station rotates through a workstation series, pausing momentarily at each workstation in the series.

Rotary blow-molding machines may, of course, include any number of molds and workstations, and may include more than one workstation series arranged around a single mold station path. In rotary blow-molding machines with a single workstation series, there is a simple relationship that determines the minimum number of carrousel indexing positions: The carrousel must pause in a number of indexing positions that is at least equal to the number of workstations in the series and at least equal to the number of mold stations. The reason for this is that each mold station must pause at each workstation in the series one time during each carrousel rotation to complete the blow molding process at each mold station. As long as the number of mold stations is equal to or greater than the number of blow-molding workstations where each mold station must pause, then the carrousel must index at least as many times as there are mold stations. If, for example, there are only two mold stations spaced 180 degrees apart, and only one workstation where each mold station must pause, the carrousel must index 180 degrees twice during each rotation to make each mold station stop at the workstation one time.

In many rotary blow molding machines the only blow-molding operations that require a mold station to pause at a fixed workstation are the parison-extrusion and article-release operations. However, following the extrusion station and preceding the release station the process requires that there be sufficient "blow time" and cooling time for each blow-molded article to properly form and harden in the cavity within each mold.

To provide sufficient "blow time" and cooling time, designers usually position the release station to immediately precede the extrusion station. With the release station positioned in this way, each mold and mold station must travel a large angular distance around the mold station path from the extrusion station to the release station, and a smaller angular distance from the release station back to the extrusion station. The average carrousel angular velocity must be slow enough to allow each mold sufficient "blow time" and cooling time as it travels this angular distance.

By adding more mold stations and indexing pauses to a carrousel, designers are able to minimize the impact that these cooling and "blow time" requirements have on the total average time it takes to produce a blow-molded bottle. While cooling and blow-time requirements must generally remain the same, additional mold stations and indexing pauses allow more extrusion and release operations to occur per revolution. However, carrousel space limitations and the absence of a workstation in the typically small angular distance between the release station and the extrusion station make it difficult to add another operation, such as in-mold labeling, to the blow-molding process.

Current rotary blow-mold carrousels are generally designed to index a number of times equal to the number of mold stations supported on the carrousel. For example, U.S. Pat. Nos. 3,854,855, 3,936,521 and 3,941,863 to Pollock et al., each disclose six-mold-station carrousels that index six times per revolution; U.S. Pat. No. 4,439,127 to Frohn discloses a five-mold-station carrousel that indexes five times per revolution; and U.S. Pat. No. 4,233,019 to Sawa et al., U.S. Pat. No. 4,834,643 to Klinedinst et al. and Japanese Pat. No. 402,165,922A to Calsonic et al. each discloses four-mold-station carrousels that index four times per revolution.

The reason that engineers design rotary blowmolder carrousels to index a number of times equal to the number of mold stations is because the carrousel must index at least this number of times to cause each mold station to pause at each workstation. However, as designers increase the number of mold stations in a rotary blow-molder, they must either enlarge the carrousels to accommodate the larger number of mold stations, or must make the mold stations smaller—so that more can fit on the same size carrousel.

Moreover, for designers to add additional operations such as in-mold labeling to rotary blow molding machines with, as is found in the prior art, the same number of indexing positions as mold stations, they must displace the article take-out workstation with the new in-mold labeling apparatus. This requires that the take-out workstation be re-located to the next preceding workstation along the mold station path. This, in turn, compresses all other blow molding operations, including cooling and blowing, into a smaller portion of the mold station path. This compression would require the carrousel to either be larger or to rotate more slowly to allow sufficient cooling and blow time. It would also constitute an inefficient use of the latter portion of the mold station path between the relocated take-out station and the extrusion station.

When in-mold labelers (IMLs) have been incorporated into rotary blow-molding machines, the IMLs have been adapted to position labels on inner mold cavity surfaces of non-indexing-type blow-molding machines. Consequently, the labels must be applied "on-the-fly", i.e., as the mold cavities move continuously around a circular path. Some current systems have accomplished this by incorporating structures that cancel relative motion between each label and its target mold cavity by accelerating the labels to match the radial velocity of their target cavities before applying the labels. Other such systems employ stationary IMLs with "picker heads" that retrieve labels from label magazines and deposit the labels into moving mold cavities. Some of these systems are capable of servicing more than one mold cavity at a time by employing multiple label magazines and label pickers. In such systems the label pickers, on each pass, transfer labels from all the magazines to all the cavities.

For example, U.S. Pat. No. 4,582,474 to Ziegler (the Ziegler patent) discloses a non-indexing rotary blow-molding machine with multiple molds and an IML with multiple carriage-mounted label pickers that move labels from multiple pairs of label magazines and deposit them into cavities in opposing halves of multiple molds. The Ziegler patent does not disclose means for properly aligning the labels with the mold cavities without adjusting the orientation and/or motion of the label pickers.

U.S. Pat. No. 4,824,630 to Mohney (the Mohney patent) discloses a non-indexing rotary blow molder with multiple mold cavities and an IML with multiple carriage-mounted label pickers for moving labels from a web of label material and depositing them into cavities in the opposing halves of multiple molds.

U.S. Pat. Nos. 4,585,408 and 4,721,451 to Darr disclose in-mold label dispensers for blow molding machines. The label dispensers disclosed in these patents include label magazines that are linearly adjustable in three dimensions, both collectively and individually. The Darr '408 patent also discloses label carriers mounted on plastic components to prevent mold damage. The plastic components prevent mold damage by breaking if a mold is closed with the label carriers inserted.

R&B Machine Tool has manufactured an IML for servicing a single-indexed rotary blow-molder. A single-indexed rotary blowmolder includes a carrousel indexer that pauses a carrousel in a number of indexing positions equal to the number of mold stations. Rather than attempting to accurately position a label on a moving cavity surface, this R&B system applies labels during "dwell" periods when the rotational motion of the rotary carrousel is momentarily halted. However, this R&B system (R&B single-cavity IML) services only one mold cavity at a time. In other words, the R&B single-cavity IML is designed to apply labels to opposite halves of a single cavity in each mold during each carrousel cycle. The R&B single-cavity IML includes a single pair of label magazines and a single pair of suction cup groupings (picker heads) for picking labels out of the magazines and carrying them to an open mold cavity halves. Because the R&B single-cavity IML services only a single mold cavity at a time, the production rate of a rotary blow-molder using this IML system is limited.

What is needed is a combined rotary blow-molding machine and IML that accurately labels blow-molded articles while producing larger numbers of such articles per carrousel rotation.

SUMMARY OF THE INVENTION

In accordance with this invention a rotary blow molding apparatus includes an in-mold labeler that inserts labels into at least two open mold cavities at a time while the blow molding apparatus momentarily holds the mold cavities stationary. The apparatus includes a support frame and a carrousel supported on the frame for rotation about a central axis. At least two mold stations are supported on the carrousel to rotate along a circular mold station path. Each mold station includes at least two mold cavities that are adapted to hold an article during blow molding. A parison-extrusion workstation is disposed adjacent the frame and the mold station path. An article-release workstation is disposed adjacent the frame and is spaced from the parison-extrusion workstation around the mold station path. A label-insertion workstation is disposed adjacent the mold station path between the article-release workstation and the parison-extrusion workstation. The in-mold labeler is disposed adjacent the label-insertion workstation and includes at least two picker heads supported on a carriage for reciprocal motion between a label retrieval position remote from the mold station path and a label deposition position within the mold station path. Each picker head releasably grasps at least one label in the label retrieval position and deposits the label into one of the mold station mold cavities when the carriage is in the label deposition position and one of the mold stations is disposed adjacent the label-insertion station. An indexer is operatively connected to the carrousel and causes the carrousel to pause in a number of indexing positions. The indexing positions and workstations are circumferentially spaced around the mold station path so that each mold station pauses in angular alignment with each workstation allowing the in-mold labeler to more accurately position labels in each mold cavity at each mold station.

According to another aspect of the present invention the in-mold labeler includes at least two pairs of label magazines supported adjacent the picker heads when the picker heads are in the label retrieval position. Each label magazine pair includes a front label magazine for holding and dispensing a stack of front labels and a rear label magazine for holding and dispensing a stack of rear labels.

According to another aspect of the present invention each magazine includes a label stack receptacle. The stack receptacle has a generally horizontal central stack receptacle axis extending parallel to the direction that labels are dispensed from the magazine. The receptacle includes at least two adjacent non-parallel label guide surfaces. Each guide surface is disposed parallel to the receptacle axis such that a label stack loaded in the magazine will rest edgewise by gravitational force on both label guide surfaces.

According to another aspect of the present invention the in-mold labeler includes individual magazine translational adjustment mechanisms. Each translational adjustment mechanism operatively connects to one of the label magazines.

According to another aspect of the present invention the in-mold labeler includes a collective translational adjustment mechanism that is operatively connected to at least two of the label magazines.

According to another aspect of the present invention the in-mold labeler includes individual rotational adjustment mechanisms. Each rotational adjustment mechanism operatively connects to one of the label magazines.

According to another aspect of the present invention the indexer is adapted to pause the carrousel in twice as many indexing positions as there are mold stations.

According to another aspect of the present invention each picker head includes a picker head case. At least two laterally-extendable label pickers are operatively connected at respective picker inner ends to a picker drive mechanism supported in the case. Each label picker includes a label gripper supported on an outer end of each label picker.

According to another aspect of the present invention at least one of the label grippers comprises a vacuum cup. The vacuum cup is operatively connected to a vacuum source.

According to another aspect of the present invention each label picker includes a slider block slidably supported for transverse reciprocal motion within each picker head case.

According to another aspect of the present invention each picker drive mechanism includes a pair of air cylinders disposed transversely within the case. Each cylinder is operatively connected between a sidewall of the case and one of the slider blocks.

According to another aspect of the present invention each label picker includes a breakaway member operatively connected between the picker drive mechanism and the label gripper.

According to another aspect of the present invention the breakaway member comprises a breakaway picker plate operatively connected between at least one of the slider blocks and at least one of the vacuum cup mounting plates. The breakaway picker plate may comprise DuPont Delrin®.

According to another aspect of the present invention the in-mold labeler may include a multiplier linkage operatively connected between the picker drive mechanism and at least one of the label pickers.

According to another aspect of the present invention at least one air cylinder is supported longitudinally within at least one of the picker head cases. The cylinder operatively connects between the case and the multiplier linkage.

According to another aspect of the present invention each multiplier linkage includes a rigid L-shaped member that is pivotally mounted within at least one of the picker head cases about a pivot point. The L-shaped member has a short leg and a long leg, each leg extending radially outward from the pivot point. Each cylinder is pivotally mounted to the case and is pivotally coupled to an outer end of the short leg of one of the L-shaped members.

According to another aspect of the present invention at least one of the slider blocks is operatively connected to an outer end of the long leg of one of the L-shaped bars.

According to another aspect of the present invention a method is provided for inserting labels into open mold cavities of a rotary blow-molding apparatus. The method includes moving the picker heads to their label retrieval positions and causing them to releasably grasp labels. The carrousel is rotated to position a first mold station adjacent the label-insertion workstation with the first mold station mold cavities open. The carrousel is then caused to pause with the first mold station positioned adjacent the label-insertion workstation. The picker heads are moved to their label deposition positions between the open mold cavities. The labels are then deposited in the open mold cavities and the picker heads are removed from their label deposition positions. These steps may be repeated for a second carrousel mold station.

According to another aspect of the present invention the above method may include positioning the labels by adjusting the orientation of at least one of the label magazines by adjusting at least one of the translational and rotational adjustment mechanisms.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
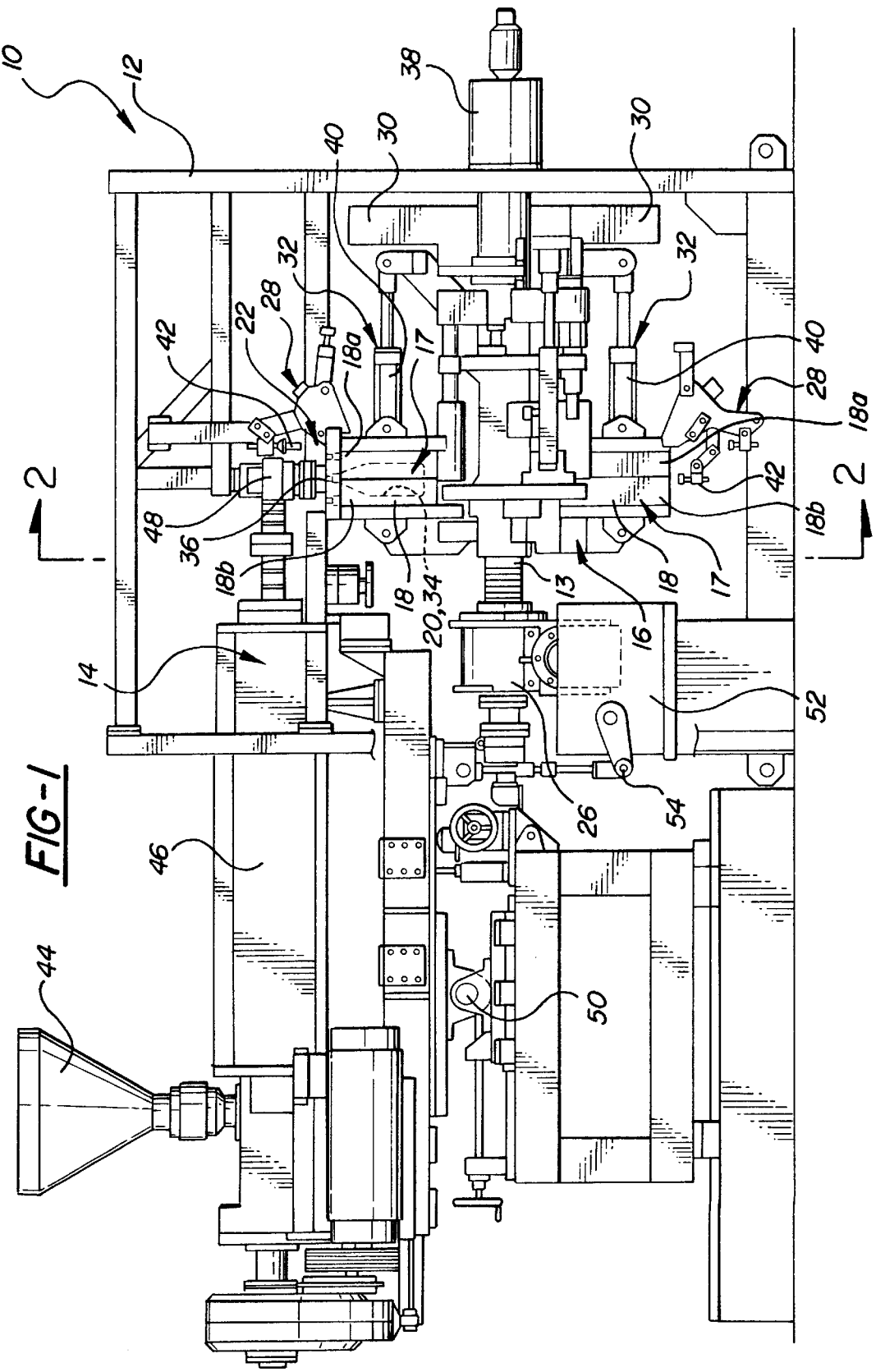
FIG. 1 is a front view of a rotary blow molding apparatus constructed in accordance with the present invention.
Figure 2:
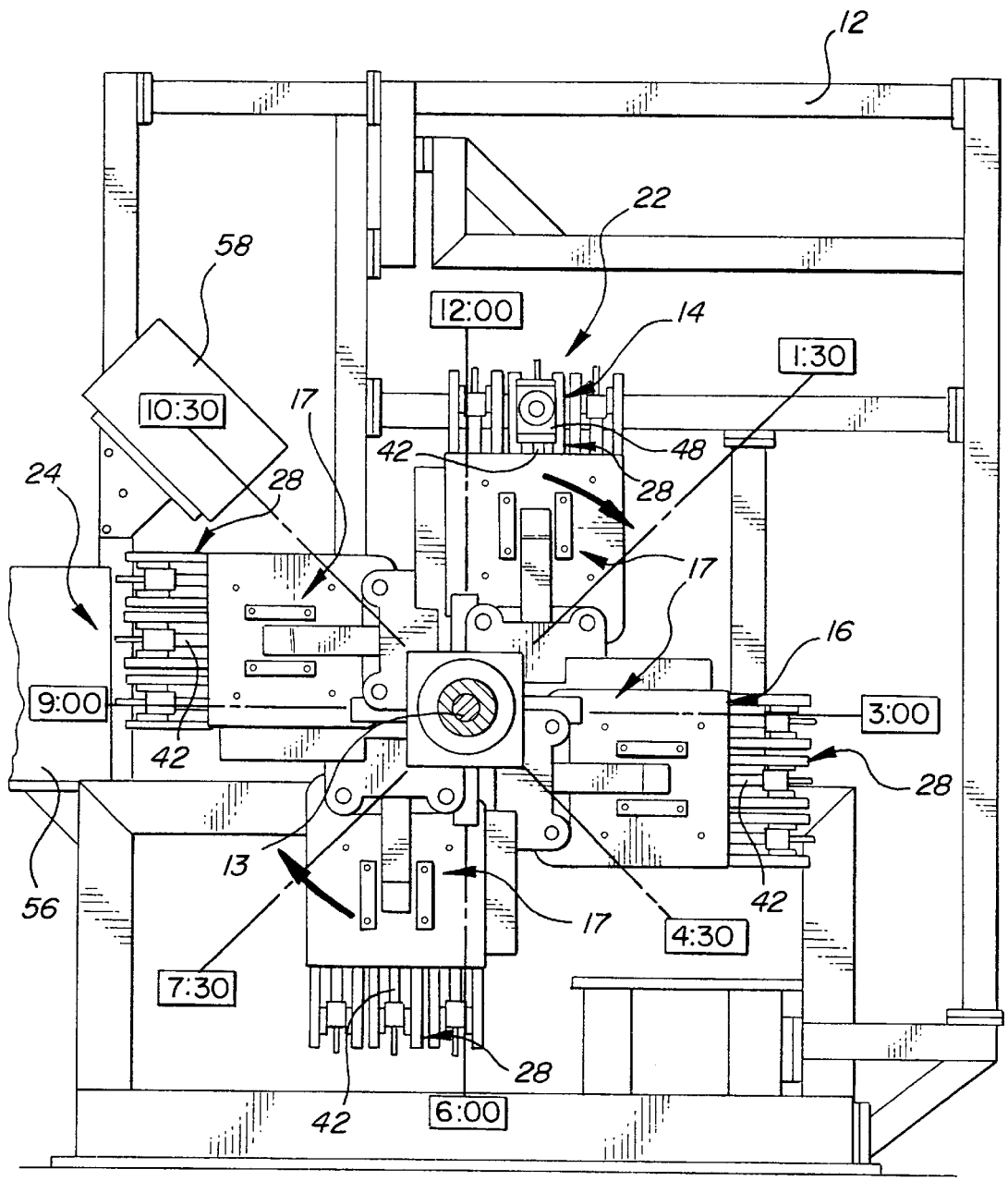
FIG. 2 is a cross-sectional end view taken along line 2—2 of FIG. 1.

A rotary blow-molding apparatus of the type for blow-molding hollow articles is generally shown at 10 in FIG. 1. The blow-molding apparatus includes a support frame 12, a parison extruder 14 and a carrousel 16. The carrousel 16, as shown in FIGS. 1 and 2, carries four mold stations 17 and is supported on the frame 12 along axle 13 to rotate about a central axis. The four mold stations 17 are supported on and rotate with the carrousel 16 around a circular mold station path. Each mold station 17 includes a mold 18. The extruder 14 is supported on the frame 12 and extrudes parison into each mold 18 at each mold station 17. As is best shown in FIG. 1, each mold 18 includes four mold cavities 20 adapted to receive the parison and form the exterior shape of the article during blow molding.

As is best shown in FIG. 2, two blow-molding workstations 22, 24 are disposed adjacent the mold station path in fixed positions relative to the frame 12, i.e., the 12:00 and the 9:00 positions relative to the mold station path, respectively. As shown in FIG. 1, an indexer 26 is operatively connected to the carrousel 16 and is adapted to momentarily halt the carrousel 16 in a number of indexing positions. The indexing positions and workstations 22, 24 are angularly spaced to cause each of the mold stations 17 to momentarily halt adjacent each of the workstations 22, 24. The mold stations 17 each halt adjacent each workstation 22, 24 to allow blow-molding operations to be performed on the article within each mold cavity 20 at each workstation 22, 24.

As shown in FIGS. 1 and 2 the carrousel assembly 16 includes four mold stations 17 and four blow pin assemblies 28 supported on each mold station 17. As shown in FIG. 2, the carrousel assembly 16 also includes hydraulic manifolds 30, and hydraulic press assemblies 32 for opening and closing the molds 18—all supported around the carrousel axle 13 to rotate around the central axis.

The four mold stations 17 are evenly-spaced around the axle 13. As shown in FIG. 1, each mold 18 includes two mold halves: a front half 18a and a back half 18b. Each mold half 18a, 18b has an inner surface with four hollowed-out portions 34. When the inner surfaces of the two halves are pressed together, the hollowed-out portions 34 join to form the four mold cavities 20. Each mold cavity 20 defines the exterior shape of a blow-molded article to be produced.

The mold halves 18a, 18b are slidably mounted opposite one another so that they may be repeatedly slid together and apart during the blow-molding process. When the mold halves 18a, 18b are joined together, four mold openings 36 remain—spaced apart across the top of the joined mold 18.

The hydraulic press assembly 32 includes an electric hydraulic pump 38 that provides hydraulic pressure through the hydraulic manifolds 30 to four hydraulic rams 40. Each hydraulic ram 40 is connected to the slidably-mounted front half 18a of one of the molds 18. The hydraulic rams 40 open each mold 18 as it passes from the 8:00 to the 9:00 position of the mold station path. The rams 40 close their respective molds 18 as they depart the 12:00 position of the mold station path.

One example of a mold station with hydraulic rams and slidably-mounted mold halves according to the present invention is disclosed in greater detail in U.S. Pat. No. 4,421,472, issued to Martin, Jr., assigned to the assignee of the present invention and incorporated herein by reference.

Four of the blow-pin assemblies 28 are mounted on each of the four mold stations 17 adjacent the front mold-half 18a of one of the four molds 18 as shown in FIGS. 1 and 2. In other words, each mold cavity 20 carries its own blow-pin assembly 28. Each of the blow-pin assemblies 28 supports a single blow pin 42.

Each blow pin assembly 28 is adapted to move its respective blow pin 42 vertically in and out of its respective mold opening 36 from a vertical insertion position directly over the mold opening 36. This allows each blow pin assembly 28 to insert its pin 42 into the extruded parison extending into the mold cavity 20 through the mold opening 36, inject air to inflate the parison, then remove the pin 42. Each blow pin assembly 28 inserts its blow pin 42 into its respective mold cavity 20 when its respective mold 18 pauses in the 1:30 position of the mold station path shown in FIG. 2. Each blow pin assembly 28 withdraws its blow pin 42 at the approximate 8:00 position shown in FIG. 2.

Each blow pin assembly 28 is additionally adapted to move its respective blow pin 42 laterally into and away from the vertical-insertion position. Each blow pin assembly 28 moves its pin 42 into the vertical-insertion position prior to lowering the pin 42 vertically into the extruded parison in the mold opening 36. Each blow pin assembly 28 retracts its pin 42 radially-outward and away from the vertical-insertion position to prevent the blow pin 42 from striking the extruder 14 as the mold station 17 that the blow pin 42 is mounted on rotates into the 12:00 position. The blow pin assemblies 28 may be of the type disclosed in U.S. Pat. No. 4,919,607 to Martin et al., assigned to the assignee of the present invention and incorporated herein by reference.

The blow pins 42 receive air from a source of pressurized air. The air is fed in a conventional manner to the blow pins 42 using a manifold within the axle 13, a pair of rotational pneumatic couplings (not shown) to provide and receive the air from the manifold, and tubes (not shown) to deliver the air to the blow pins. The blow pins 42 are hollow, allowing air to pass through them and into the parison. The injected air expands and stretches the molten parison outwardly until the parison contacts and conforms itself to the inner walls of the mold cavity 20.

The blow molding workstations 22, 24 are supported at fixed locations around the mold station path. The workstation positions are fixed in relation to the frame 12. Each workstation 22, 24 includes structures external to the carrousel 16 that perform operations on the molds 18 or blow-molded articles contained in the molds 18.

The blow-molding workstation 22 at the 12:00 position of the mold station path includes a parison extruder 14. The extruder 14 includes a hopper 44 for receiving parison pellets and a parison heater 46 that heats the pellets until they melt. As shown in both FIGS. 1 and 2, the extruder 14 also includes an extrusion head 48 that extrudes a molten parison into each of the four mold cavities 20 in each mold station. The extrusion head 48 is reciprocally supported on the frame 12 above the mold station path at the mold station path's 12:00 position.

The reciprocal motion is necessary to move the extrusion head 48 out of the mold station path and prevent a collision as each mold station 17 rotates into the 12:00 position. To produce the reciprocal motion, the extruder 14 is mounted on a pivot 50. An extruder lift cam box 52 is operatively connected to the extruder 14 through a mechanical linkage 54, and causes the extruder 14 to rock back and forth on the pivot 50. The distance between the pivot 50 and the extrusion head 48 is great enough so that the rocking motion produces an essentially vertical up-and-down reciprocal motion at the extrusion head 48.

The blow-molding workstation 24 at the 9:00 position of the mold station path includes an article take-out mechanism as shown at 56 in FIG. 2. The take-out mechanism 56 may be one of a number of such mechanisms known in the art to be capable of sequentially removing articles from the molds of rotary blow-molding carrousels. An example of such a rotary take-out mechanism is disclosed in U.S. Pat. No. 4,902,217 to Martin et al., assigned to the assignee of the present invention and incorporated herein by reference. The take-out mechanism 56 removes articles from the molds 18 as each mold station 17 halts in the 9:00 position of the mold station path.

During each carrousel revolution, the indexer 26 momentarily halts the carrousel 16 in twice as many indexing positions as there are mold stations 17. This additional indexing creates four additional pause positions for each mold station 17 as it travels around the mold station path, i.e., the 1:30, 4:30, 7:30 and 10:30 positions of the mold station path.

The additional pause positions allow additional operations to be carried out on the articles between blow-molding workstations 22 and 24. This maximizes the portion of the mold station path used for blowing and cooling, yet provides an additional workstation for in-mold labeling to be carried out. In other words, additional indexing positions allow additional operations to be carried-out on each mold 18 without inefficiently compressing other blow-molding operations into the early portion of the mold station path.

Therefore, the indexer 26 causes the four-mold-station carrousel 16 to pause in a total of eight indexing positions per revolution. This causes each of the four mold stations 17 to pause in each of each of eight (12:00, 1:30, 3:00, 4:30, 6:00, 7:30, 9:00 and 10:30) positions around the mold station path, once during each complete 360 degree carrousel rotation.

As shown in FIG. 2, an in-mold labeler 58 is disposed adjacent the carrousel circumference and is adapted to insert a label into each mold 18 when the mold 18 pauses at the 10:30 position of the mold station path. Each mold station 17 pauses at the 10:30 position immediately after it leaves the 9:00 release workstation 24 and immediately before it arrives at the 12:00 parison-extrusion workstation 22. The in-mold labeler 58 may be of any type known in the art—including the type that affixes the label to the walls of a mold cavity by vacuum suction.

In practice, the carrousel 16 is indexed to sequentially rotate each mold station 17 into a position beneath the extrusion head 48 at the parison-extrusion workstation 22 with the mold halves 18a, 18b open. There, the extruder 14 sends molten parison through the extrusion head 48 and extrudes four lengths of the parison between the mold halves 18a, 18b. The mold halves 18a, 18b then close together around the four extruded lengths of parison, clamping each length of parison at one of the four mold openings 36 and suspending one length of extruded parison in each of the four mold cavities 20. At the 1:30 position, each respective blow pin assembly 28 inserts its four blow pins into the four lengths of molten parison clamped in the four mold openings 36, and begins injecting air into each length of parison. Air is being blown into the molten parison as each mold station 17 rotates between the 3:00 and the 7:30 positions. At the approximate 8:00 position, each blow pin assembly 28 vertically extracts and laterally retracts its four blow pins 42. The carrousel 16 then completes its indexing of each mold station 17 into a position adjacent the article-release workstation 24 located at the 9:00 position of the mold station path. There, the mold halves separate and the take-out mechanism 56 removes the four blown articles from the four mold cavities 20. The carrousel 16 is then indexed to rotate the mold cavities 20 into a position past the release workstation 24 and prior to the parison-injection workstation 22, i.e. the 10:30 position of the mold station path. There, an in-mold-labeling device 58 inserts labels into the open mold cavities 20. Following label-insertion, the open mold 18 advances back to the parison-extrusion workstation 22 at the 12:00 position of the mold station path.

In other embodiments of the present invention there may be more than four, or as few as two mold stations 17. Moreover, each mold station 17 may include more than four, or less than four mold cavities 20. There could also be more than two blow-molding workstations, i.e., more than two external blow molding operations may be carried out on each mold station 17 or article during each carrousel rotation. Other embodiments may also include operations other than in-mold-labeling at the additional mold station pause positions around the mold station path.

Unlike prior art rotary blow molding machines that index a number of times equal to the number of mold stations, a rotary blow molding machine constructed according to the present invention doubles carrousel indexing without increasing the number of mold stations. Therefore, according to this invention, larger molds with larger cavities or with more molds per mold station may be used, for a given carrousel size and for a given number of pause positions around the mold station path.

In the present embodiment, the in-mold labeler 58 is supported on the frame 12 at a label-insertion workstation 23 between the parison extrusion workstation 22 and the article-release workstation 24. The in-mold labeler 58 includes four picker heads 118, generally indicated at 118 in FIGS. 3 and 6–9. The four picker heads 118 are supported in a stacked array on a carriage, shown at 122 in FIGS. 3 and 6, for reciprocal motion between a label retrieval position remote from the mold station path and a label deposition position within the mold station path. An electric servo motor 108 (available from Indramat under part designation # DKS/MDD71B) is operatively connected to a pulley, which drives a belt-type linear actuator 110, which, in turn, drives the carriage 122 between the label retrieval and label deposition positions.

Each picker head 118 is adapted to releasably grasp a forward and a rear label in the label retrieval position and to deposit the labels into forward 20a and rear 20b halves of one of the four mold station mold cavities 20. The picker heads 118 deposit the labels when the carriage 122 is in the label deposition position and one of the mold stations 17 is disposed adjacent the label-insertion station 23. One of the open molds is indicated at 18a, 18b in FIG. 3. The labels are inserted into empty mold station mold cavities 20 so that the labels will adhere to blow-molded articles when those articles are later formed in the mold cavities 20. The motion of the carriage 122 is synchronized with that of the rotary carrousel 16.

The carrousel indexer 26, by causing each mold station 17 to pause in angular alignment with the label-insertion workstation 23, allows the in-mold labeler 58 to more accurately position labels in each mold cavity 20 at each carrousel mold station 17. Moreover, because the indexer is adapted to pause the carrousel in twice as many indexing positions as there are mold stations 17, the article-release 24, label-insertion 23, and parison-extrusion 22 workstations can be grouped together along a smaller portion of the mold station path. This closer grouping speeds up the article production rate by allowing the carrousel rotation rate to be increased without reducing blowing and cooling time between parison extrusion and article release. The carrousel rotation rate may be increased because a greater portion of each carrousel rotation can be devoted to the blowing and cooling steps of the blow-molding process described above. In other words, the parison insertion, article take-out and labeling steps can be accomplished in half the circumferential distance of a single-indexed system. This reserves a greater portion of the mold station path for blowing and cooling operations and consequently allows the carrousel rotation rate to be increased without decreasing blowing and cooling time.

Figure 3:
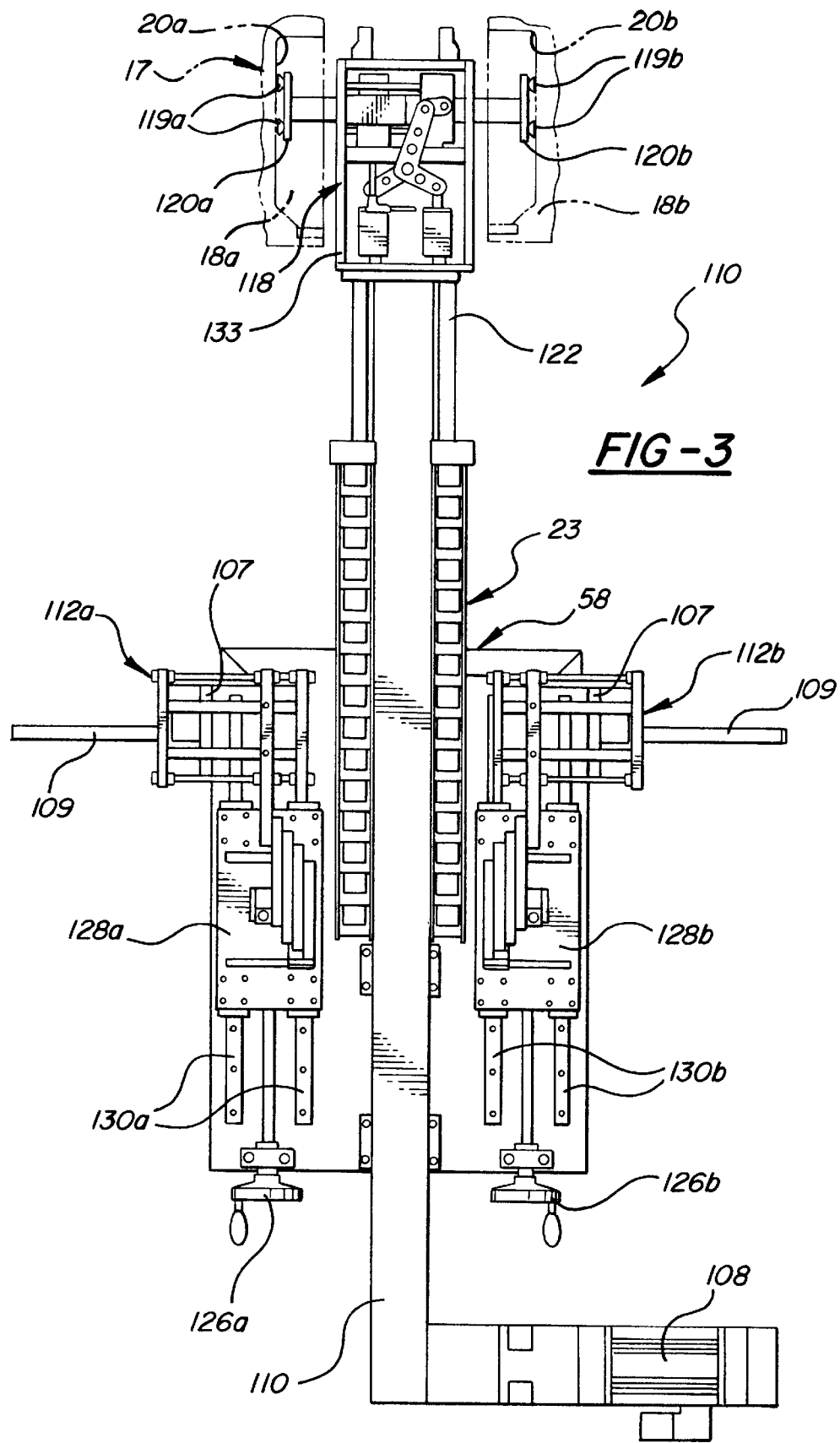
FIG. 3 is a view of an in-mold labeler constructed in accordance with the present invention viewed along line 3—3 of FIG. 6.
Figure 6:
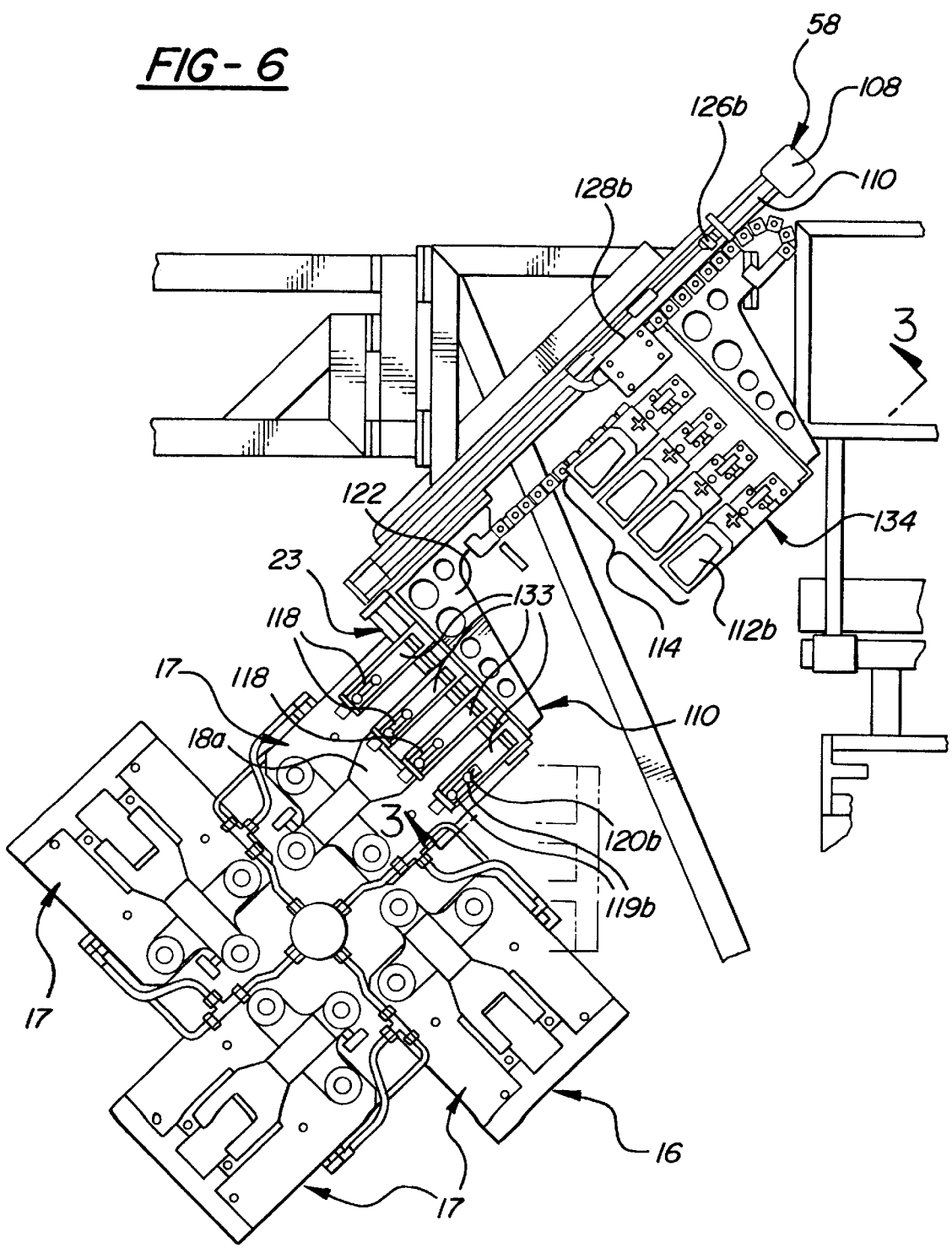
FIG. 6 is a front view of an in-mold labeler constructed according to the present invention and mounted on a rotary blow-molding apparatus.

As shown in FIG. 6, the in-mold labeler 58 includes an array of four sets of opposing label magazine pairs 114 supported adjacent the picker heads 118 when the picker heads 118 are in the label retrieval position. In FIG. 3 a single pair of magazines generally indicated at 112a and 112b representatively illustrates the four magazine pairs. Each label magazine pair 12a, 112b includes a front label magazine 112a for holding a stack of front labels and a rear label magazine 112b for holding a stack of rear labels. A plurality of front labels is stacked within each of the front magazines 112a and a plurality of rear labels is stacked within each of the rear magazines 112b.

Figure 4:
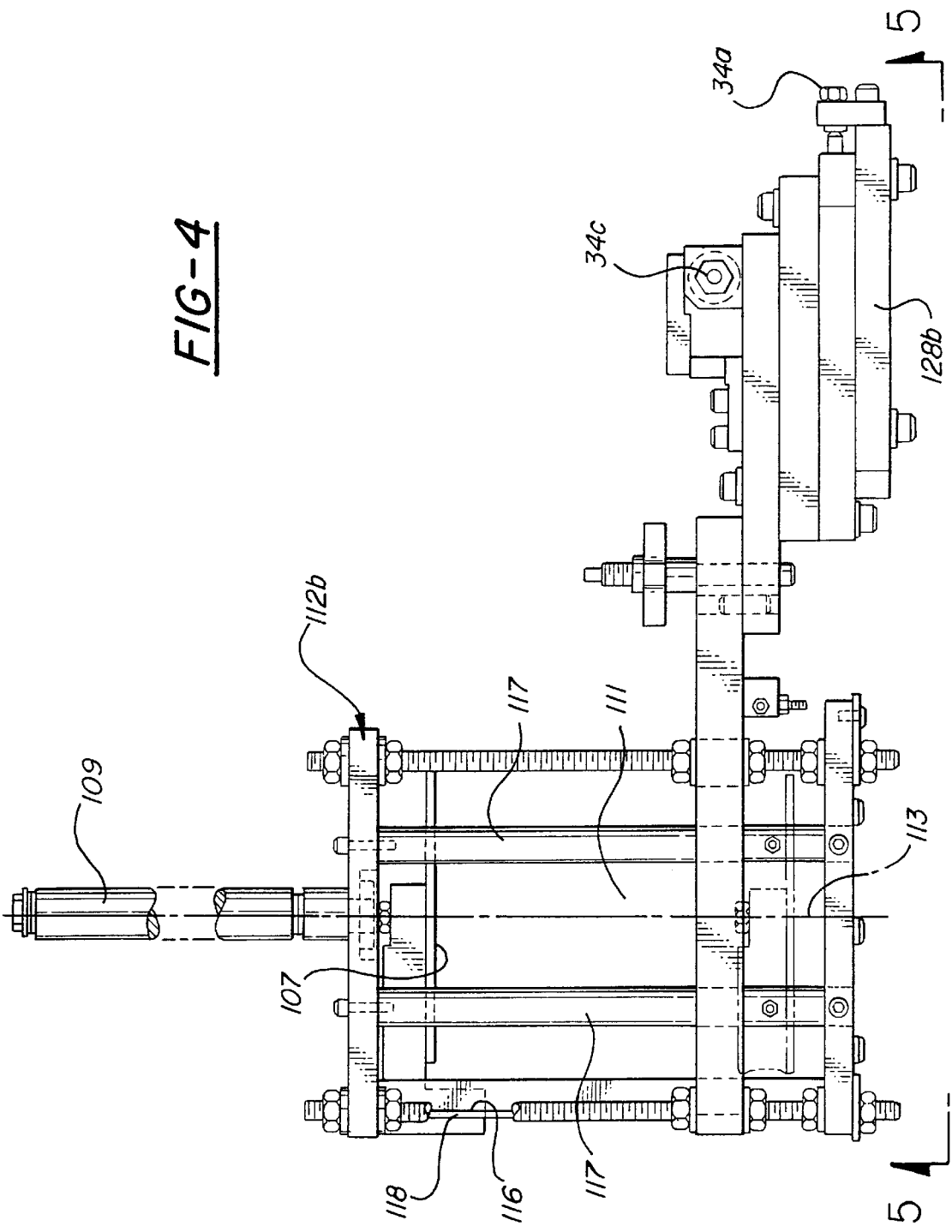
FIG. 4 is a magnified side view of a label magazine and magazine mounting and adjustment assembly of the in-mold labeler of FIG. 3.
Figure 5:
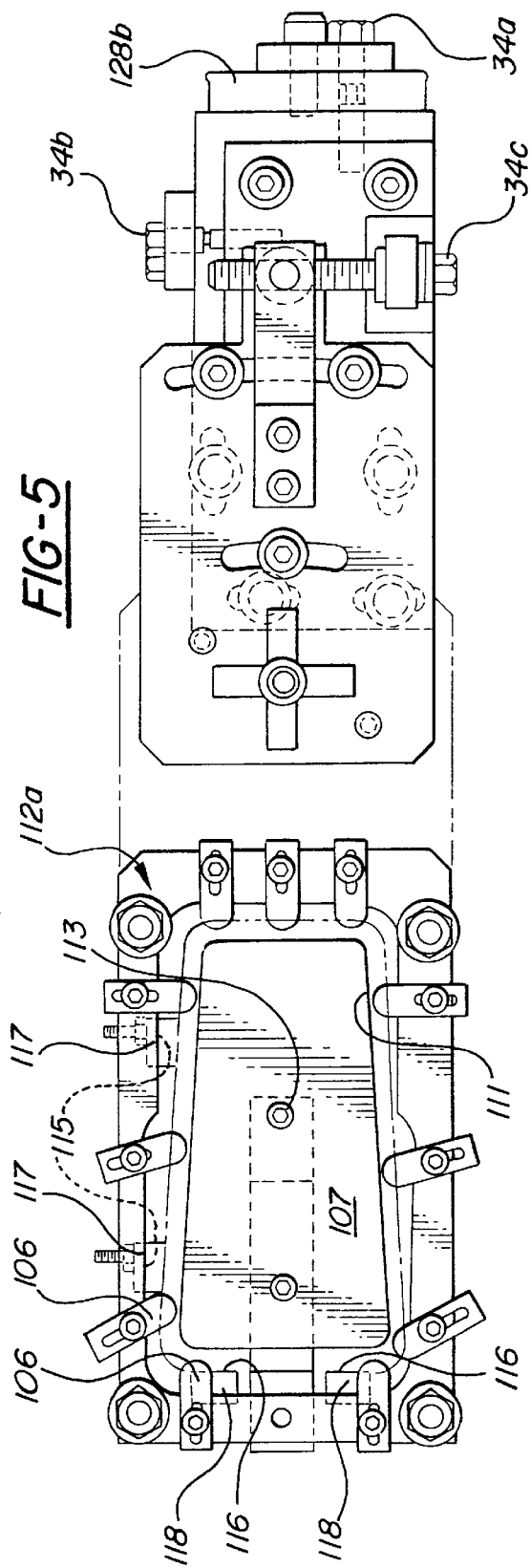
FIG. 5 is an end view of a label magazine and magazine mounting and adjustment assembly of FIG. 4.
Figure 5A:
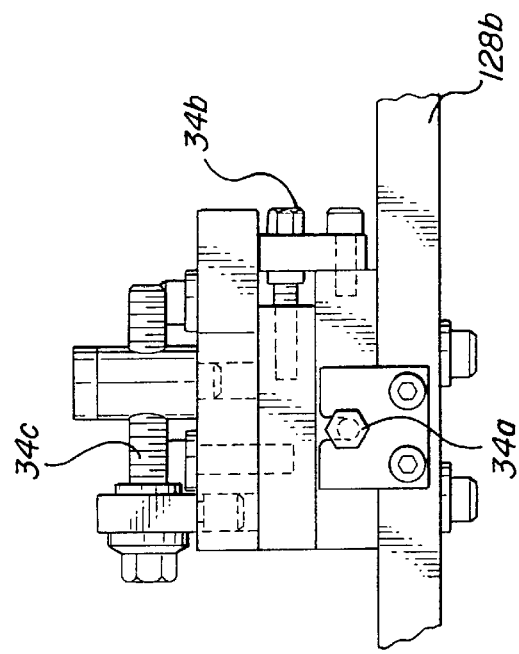
FIG. 5A is a top view of a label magazine mounting and adjustment assembly of FIG. 5.

As is representatively shown in FIGS. 4 and 5, each individual label magazine 112a, 112b includes a label stack receptacle 111. A generally horizontal central stack receptacle axis 113 extends parallel to the directions that labels are dispensed from the magazine and perpendicularly through each label in a label stack loaded in the magazine 112a, 112b. As shown in FIG. 6, the entire label magazine array 114 is oriented such that the stack receptacle axis 113 of each individual magazine 112a, 112b is disposed generally parallel to the ground. A pressure plate 107 driven by an air cylinder 109 (available from Bimba under part designation # 046-D) provides continuous pressure on the label stack to advance the label stack as labels are dispensed from the magazine. As is best shown in FIG. 5, each magazine 112a, 112b includes a plurality of adjustable retainer fingers 106 that prevent labels from departing the magazines until a picker head 133 retrieves the labels.

As is representatively shown for front label magazine 112a in FIG. 5, the label stack receptacle 111 of each individual label magazine 112a, 112b also includes at least two adjacent non-parallel label guide surfaces 115, 116. As is representatively shown in FIGS. 4 and 5, these guide surfaces 115, 116 are disposed on two respective pairs of guide bars 117, 118 that extend across each of two adjacent sides of each magazine 112a, 112b, partially defining the stack receptacle 111 of each magazine 112a, 112b. Both of the guide surfaces 115, 116 and guide bar pairs 117, 118 are disposed parallel to the stack receptacle axis 113 such that a label stack will rest by gravitational force on both pairs of label guide bars 117, 118 when the stack is loaded in the magazine 112a, 112b. Because the guide surfaces 115, 116 of the guide bar pairs 117, 118 are nonparallel, they serve to maintain the labels in a uniform stack as the labels advance along the stack receptacle axis 113 in each magazine 112a, 112b and are retrieved for insertion.

As is representatively shown in FIGS. 4 and 5 and as is also shown in FIG. 6, individual magazine translational and rotational adjustment mechanisms, in the form of a plurality of push-pull nut and bolt connections 134a–c, are operatively connected to each of the label magazines 112a, 112b. A vertical adjustment bolt 34a, a lateral adjustment bolt 34b, and a rotational adjustment bolt 34c (available from Stilson under part designation # AS-8208-2" LG along with Stilson yoke #YB-8224) adjust the vertical, lateral and rotational position of each magazine.

In addition, as is best shown in FIG. 3, each of the front label magazines 112a is mounted to a single front adjustable plate 128a and each of the rear label magazines 112b is mounted to a single rear adjustment plate 128b. The front 128a and rear 128b adjustment plates permit an operator to collectively adjust the orientation of all the respective front labels and rear labels in relation to respective front 20a and rear 20b mold cavity halves. An operator may do this by collectively adjusting the orientation of the respective front 112a and rear 112b label magazines. More specifically, a front crank, shown at 126a in FIG. 3, allows an operator to collectively adjust all four front magazines 112a, longitudinally, in the direction of carriage 122 movement, along a pair of rails 130a. A rear crank, shown at 126b in FIG. 3, allows an operator to longitudinally adjust all four rear magazines 112b along a second pair of rails 130b.

Figure 7:
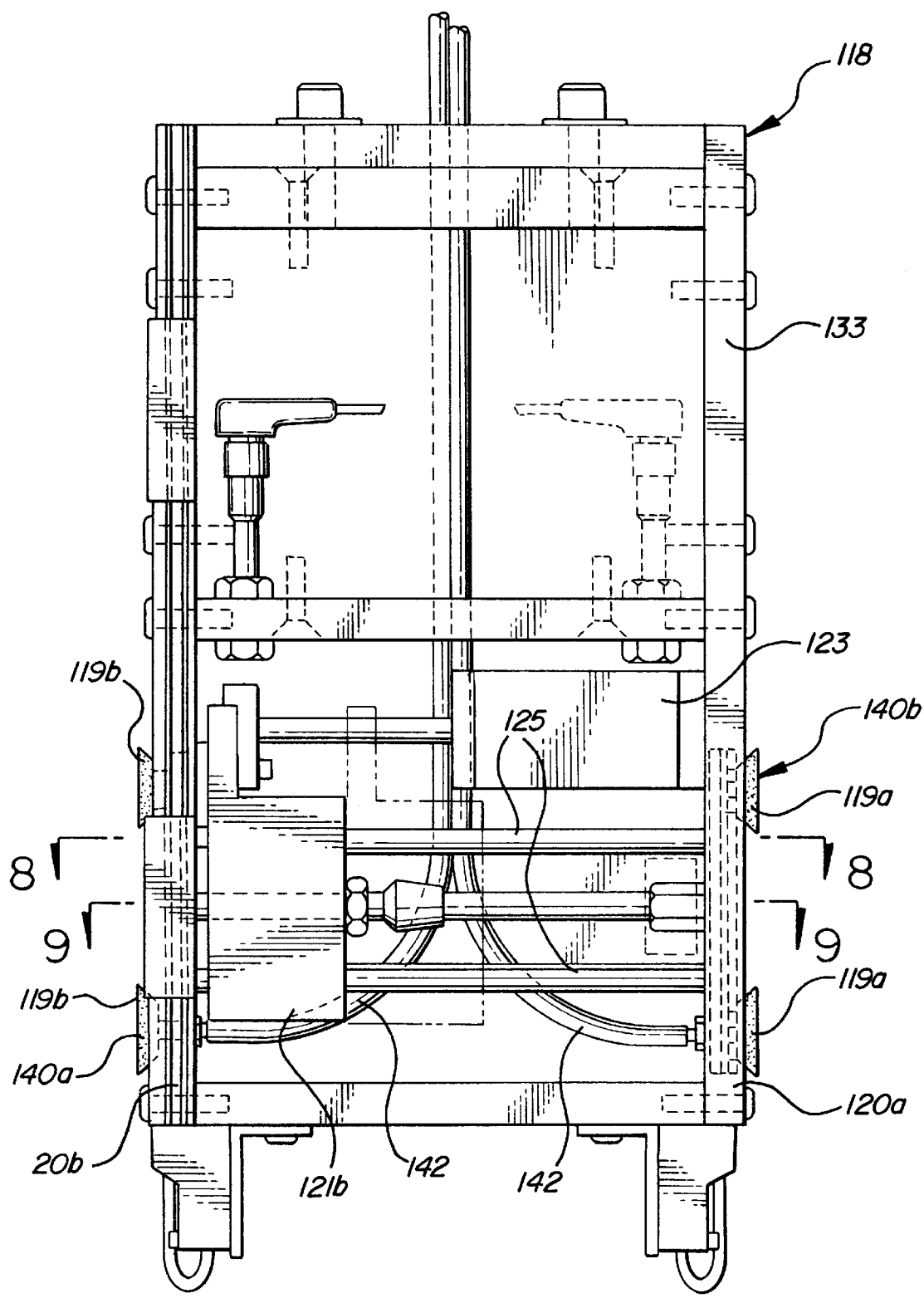
FIG. 7 is a magnified view of a picker head of the in-mold labeler of FIG. 3.
Figure 8:
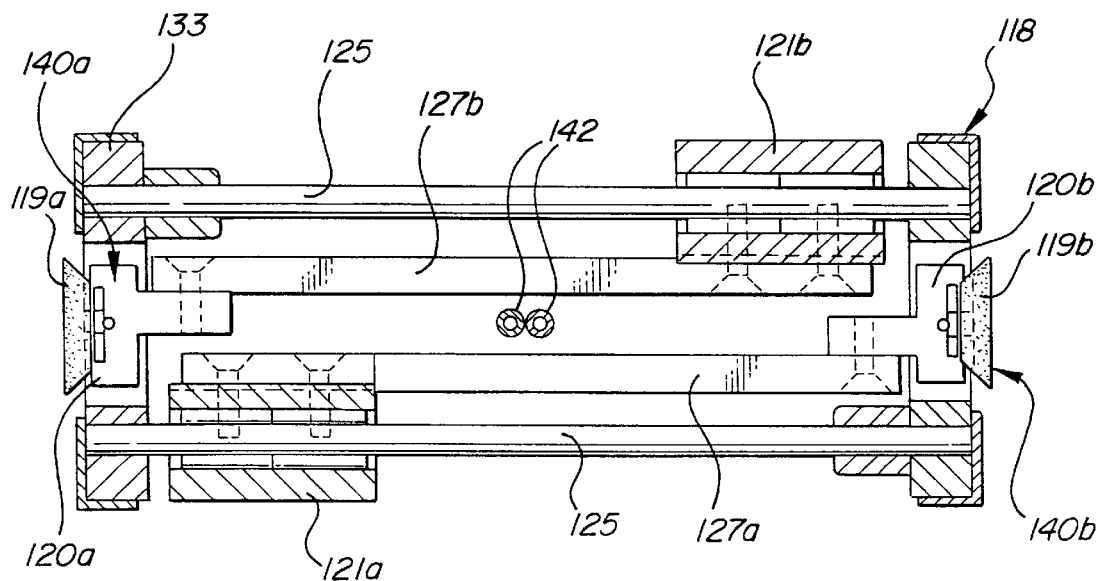
FIG. 8 is a cross sectional view of the picker head of FIG. 7 taken along line 8—8 of FIG. 7.
Figure 9:
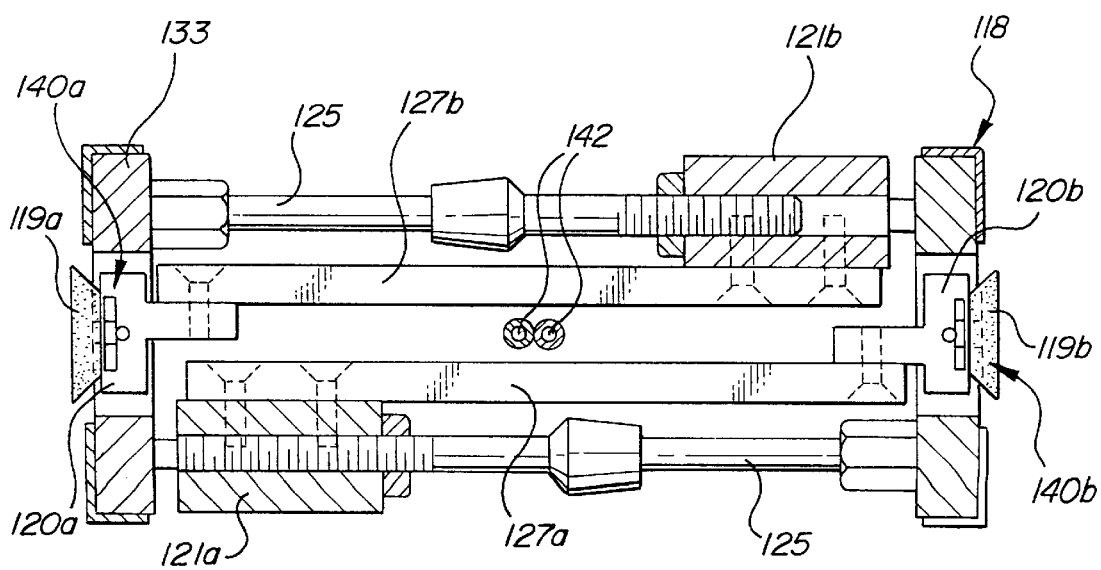
FIG. 9 is a cross sectional view of the picker head of FIG. 7 taken along line 9—9 of FIG. 7.

As shown in FIGS. 3 and 6–9, each picker head 118 includes a picker head case 133. In the present embodiment the case 133 has the general shape of a rectangular frame. However, in other embodiments the case 133 may have any suitable configuration to include an enclosed box or a simple platform for supporting the various elements of the picker head 118. At least two laterally-extendable label pickers, generally indicated at 140a and 140b in FIGS. 7–9, are operatively connected at respective picker inner ends to a picker drive mechanism comprising two air cylinders 123 (available from Bimba under the part designation #F0-04-2.5-3R-CFT-G-W/Molycoat Flat-1 Series Double Acting Single Rod, ¾" Bore, 2½" Stroke) supported in the case 133. The air cylinders 123 are positioned to drive the label pickers 140a, 140b laterally outward from the picker head 118 case 133 as is described in greater detail below. As shown in FIGS. 6–9, each label picker includes a label gripper comprising two suction or vacuum cups 119a, 119b supported on a vacuum cup mounting plate 120a, 120b fastened to an outer end of each label picker 140a, 140b by well-known means. As is best shown in FIG. 7, each vacuum cup 119a, 119b is operatively connected to a vacuum source (not shown) by a vacuum tube 142.

As is also shown in FIGS. 7–9, each label picker 140a, 140b includes a metal platen or slider block 121a, 121b from slidably supported by ball bearings on a pair of guide rails 125 for transverse reciprocal motion within each picker head case 133. The motion of the slider blocks 121a, 121b is transverse with respect to the direction of carriage 122 motion.

As shown in FIGS. 7–9, the air cylinders 123 of each picker drive mechanism are disposed transversely within the case 133. Each cylinder 123 is operatively connected between a sidewall of the case 133 and one of the slider blocks 121a, 121b. Upon activation, each air cylinder 123 causes one of the label pickers 140a, 140b to move outward along the guide rails 125 in a direction transverse to carriage 122 movement and opposite to the outward movement of the other label picker 140b, 140a.

As shown in FIGS. 7–9, the label pickers 140a, 140b each include a picker plate 127a, 127b formed from DuPont Delrin® to serve as a breakaway member. These "breakaway" picker plates 127a, 127b are each operatively connected between the picker drive mechanism 123 and a label gripper 119a, 119b. More specifically, each breakaway picker plate is connected between a 121a, 121b and a vacuum cup mounting plate 120a, 120b. Each vacuum cup mounting plate 120a, 120b is supported on an outer end of each breakaway picker plate 127a, 127b. The breakaway picker plates 127a, 127b provide designed breaking points that allow the label pickers 140a, 140b to yield in response to inadvertent contact with expensive machine parts. If, for example, a label picker 140a, 140b should extend or remain extended as the picker head 118 moves between the label deposition and label retrieval positions, the label picker 140a, 140b will strike a portion of the mold station 17. Rather than resisting the 3impact, the breakaway picker plate 140a, 140b will yield or break before the label picker 140a, 140b can cause serious damage to the mold station 17.

Figure 10:
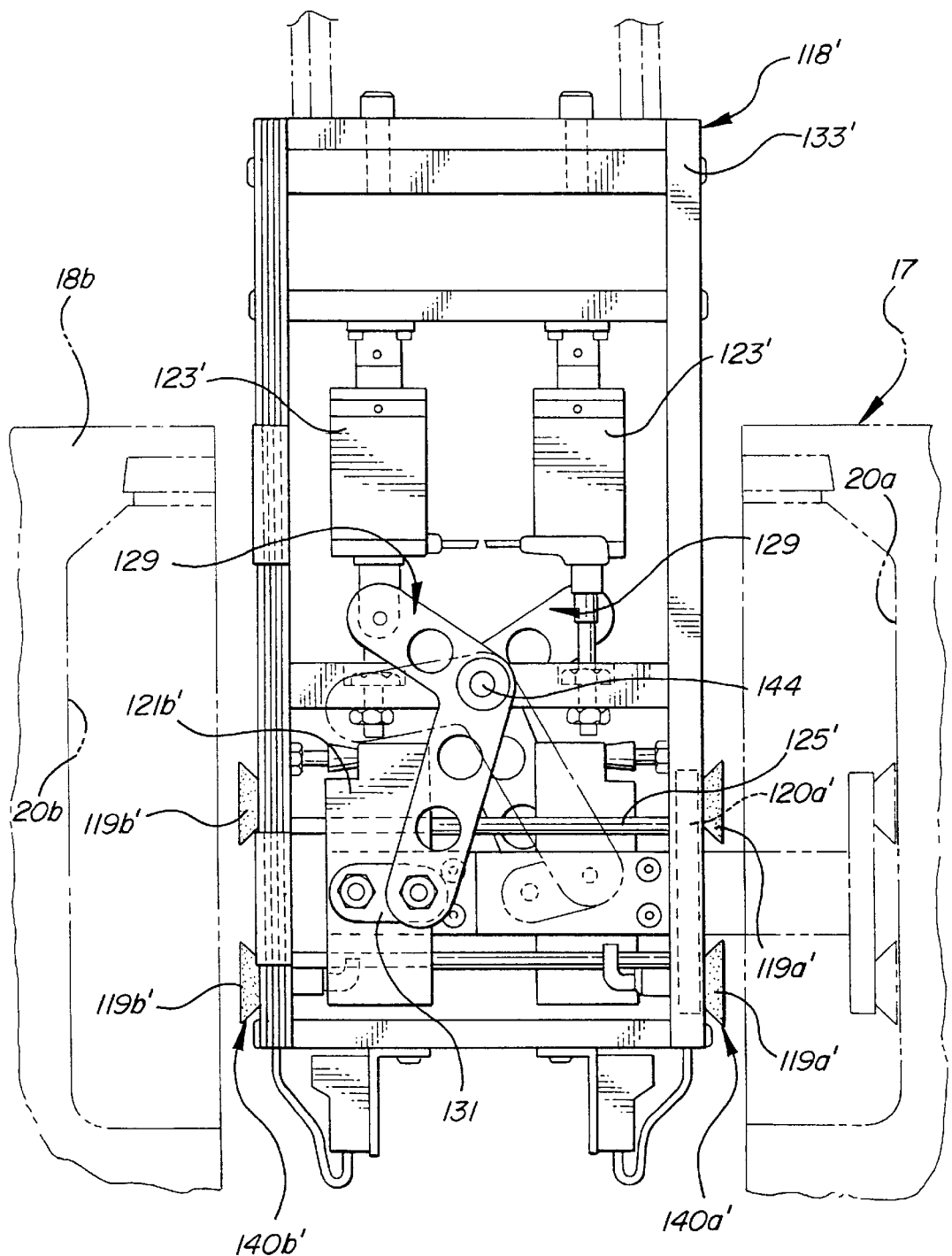
FIG. 10 is a top view of an alternative picker head.
Figure 11:
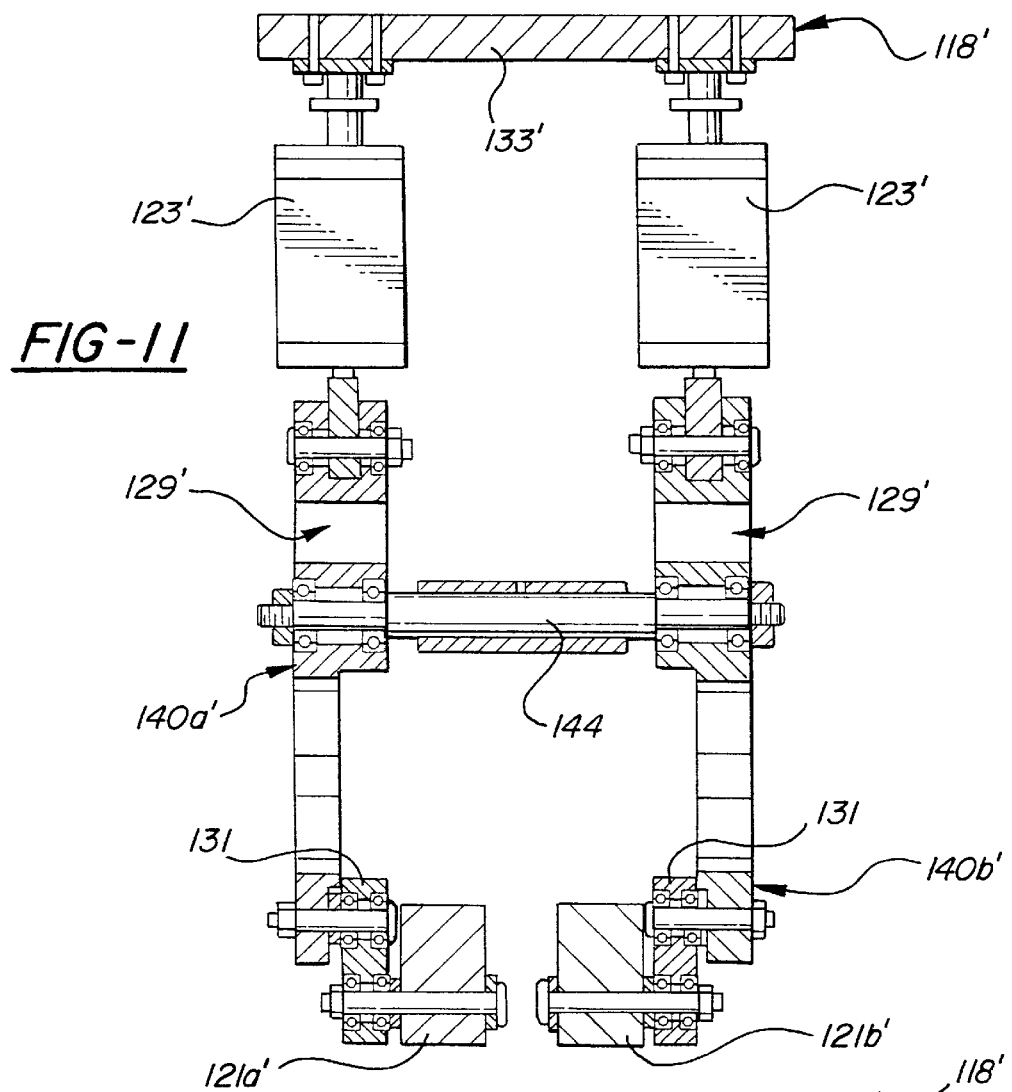
FIG. 11 is a side view of a picker drive mechanism, label pickers and multiplier linkages of the picker head of FIG. 10.
Figure 12:
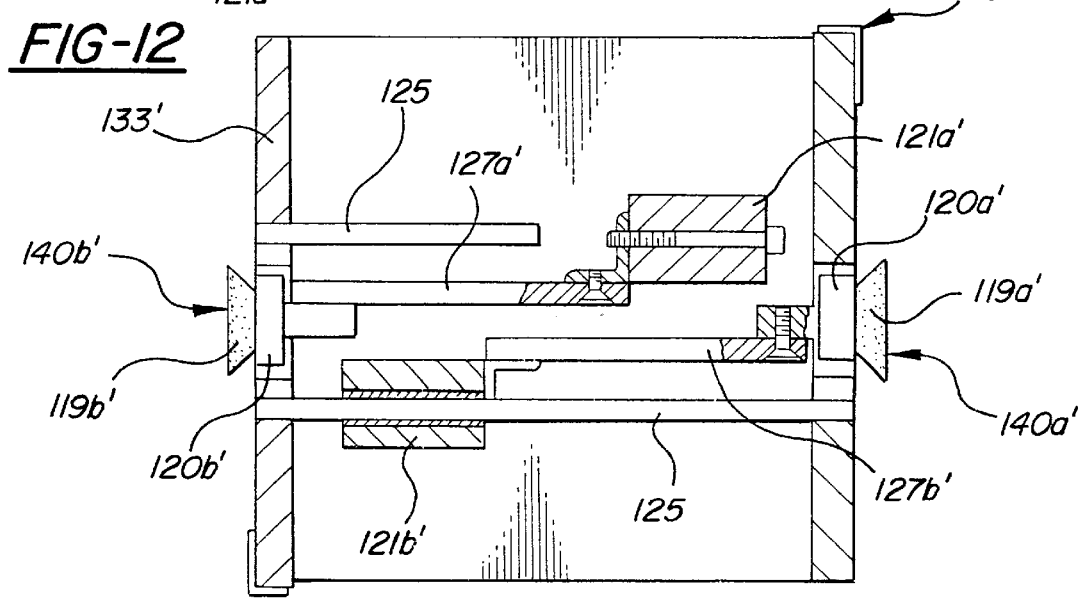
FIG. 12 is an end view of the label pickers and multiplier linkages of FIG. 11.

An alternative construction of the picker head 118 of the second embodiment is shown at 118' in FIGS. 10–12. Reference numerals with the designation prime (') in FIGS. 10–12 indicate alternative configurations of elements that also appear in FIGS. 1–9. Where a portion of the above description of the picker head 118 uses a reference numeral to refer to the figures, that portion of the description applies equally to elements designated by corresponding primed numerals in FIGS. 10–12.

According to the alternative picker head construction shown in FIGS. 10–12, each picker head 118' includes two multiplier linkages 129 that are operatively connected between respective picker drive mechanism air cylinders 123' (available from Bimba under part designation #F0-04-2-1-CMT-G-W) and the respective label pickers 140a', 140b'. The multiplier linkages 129 allow the label pickers 140a', 140b' to extend a greater lateral distance outward from the label picker case 133' for a given air cylinder stroke distance. This allows the picker heads 118' to place labels in deeper mold cavities.

As shown in FIGS. 10 and 11, the two air cylinders 123' are longitudinally supported, i.e., parallel to carriage 122 motion, within each picker head casing 133'. The air cylinders 123' are operatively connected between an end wall of the casing and the multiplier linkages 129.

As shown in FIG. 10, each multiplier linkage includes an L-shaped flat steel bar that is pivotally mounted within each picker head casing 133' about a common pivot pin 144. Each L-shaped bar has a short leg and a long leg, each of which extend radially outward from the pivot pin 144. Each air cylinder 123' is pivotally mounted to the casing 133' and pivotally coupled to an outer end of the short leg of one of the L-shaped bars. Each slider block 121a', 121b' is operatively connected to an outer end of the long leg of one of the L-shaped bars through a short transfer link shown at 131 in FIGS. 10 and 11.

In practice, labels are inserted into the open mold cavities 20a, 20b of the rotary blow-molding apparatus by first individually adjusting the lateral and rotational orientation of each label magazine 112a, 112b to coincide with the desired position for each label within each mold cavity 20a, 20b. An operator may accomplish these adjustments by adjusting the plurality of push-pull nut and bolt connections shown at 134 in FIGS. 4 and 6. Labels may be loaded into the magazines 112a, 112b either before or after these adjustments are made.

The picker heads 118 are then moved to their label retrieval positions where the two air cylinders 123 in each of the four picker heads 118 are actuated. Each air cylinder 123 causes one of the label pickers 140a, 140b to move outward along the guide rails 125 in a direction transverse to carriage 122 movement and opposite to the outward movement of the other label picker 140b, 140a. As the label pickers 140a, 140b move transversely away from each other their vacuum cups 119a, 119b contact and releasably grasp labels held in the magazine array 114. The carrousel 16 is rotated to position one of the carrousel mold stations 17 adjacent the label-insertion workstation 23 with the mold cavities 20a, 20b of that mold station 17 open. The carrousel 16 is paused at this point with the mold station positioned adjacent the label-insertion workstation 23. The air cylinders 123 are then actuated to draw the label pickers 140a, 140b inward. At this point the carriage 122 begins to move the picker heads 118 toward the opposite limit of their reciprocal motion. At this opposite limit, the picker heads 118 are in their label deposition position between the open mold halves 18a, 18b and mold cavities 20a, 20b of the mold carrousel mold station 17 positioned at the label-insertion workstation 23. At this point the label pickers 140a, 140b again extend laterally outward and deposit the labels in the open mold cavities 20a, 20b. The label pickers 140a, 140b then retract in the picker heads 118 and the picker heads 118 move out of their label deposition positions. This process is then repeated for each of the carrousel mold stations 17 through as many cycles as are necessary to produce a desired number of labeled hollow articles. As the carriage 122 moves the array of picker heads 118 to a position between the mold halves 24a, 24b, the label pickers 140a, 140b are once again driven outward. The vacuum cups 119a, 119b deposit the labels against inner cavity walls 20a, 20b of the mold halves 18a, 18b.

The multiplier linkage extends the reach of the pickers allowing them to service deeper mold cavities, and the individual magazine adjustment feature allows an operator to accurately position labels in multi-cavity molds by individually adjusting the magazines and without adjusting the pickers or the molds. This feature is especially useful where individual mold cavities in a multi-cavity mold are not evenly spaced, are not radially aligned with one another or are shaped differently to produce different articles.

The above description illustrates embodiments of the present invention by using descriptive rather than limiting words. Obviously, there are many ways that one might modify these embodiments while remaining within the scope of the claims. In other words, there are many other ways that one may practice the present invention without exceeding the scope of the claims.

What is claimed is:

1. A method for inserting labels into open mold cavities of a rotary blow-molding apparatus comprising a carrousel rotatably supported on a support frame, at least two mold stations supported on the carrousel to rotate along a circular mold station path, each mold station including at least two mold cavities, a parison-extrusion workstation disposed adjacent the frame and the mold station path, an article-release workstation disposed adjacent the frame and spaced from the parison-extrusion workstation around the mold station path, a label-insertion workstation disposed adjacent the mold station path between the article-release workstation and the parison-extrusion workstation, an in-mold labeler disposed adjacent the label-insertion workstation and including at least two picker heads supported on a carriage for reciprocal motion between a label retrieval position remote from the mold station path and a label deposition position within the mold station path, the picker heads each adapted to releasably grasp at least one label in the label retrieval position and to deposit the label into one of the mold cavities of one of the mold stations when the carriage is in the label deposition position and one of the mold stations is disposed adjacent the label-insertion station, an indexer operatively connected to the carrousel and adapted to pause the carrousel in a number of indexing positions, the indexing positions and workstations circumferentially spaced around the mold station path so that each mold station pauses in angular alignment with each workstation allowing the in-mold labeler to position labels in each mold cavity of each mold station; the method comprising the steps of:

moving the picker heads to their label retrieval positions;

releasably grasping labels with the picker heads;

rotating the carrousel to position a first mold station adjacent the label-insertion workstation with the first mold station mold cavities open;

pausing the carrousel with the first mold station positioned adjacent the label-insertion workstation;

moving the picker heads to their label deposition positions between the open mold cavities;

depositing the labels in the open mold cavities; and removing the picker heads from their label deposition positions.

2. A method as set forth in claim 1 further including the additional step of repeating the label retrieval, label grasping, carrousel rotating, carrousel pausing, label insertion, label deposition, and picker head removal steps for a second carrousel mold station.

3. A method as set forth in claim 1 further including the label position adjustment steps of:

providing at least two pairs of label magazines supported adjacent the picker heads when the picker heads are in the label retrieval position;

providing individual magazine translational adjustment mechanisms and operatively connecting them to respective ones of the label magazines;

providing individual magazine rotational adjustment mechanisms and operatively connecting them to respective ones of the label magazines; and adjusting the orientation of at least one of the label magazines by adjusting at least one of the translational and rotational adjustment mechanisms.

4. A method as set forth in claim 3 in which the step of providing individual magazine translational adjustment mechanisms includes providing translational adjustment mechanisms configured to:

translationally adjust magazine position in a first direction generally parallel to a label plane defined by a label loaded in the magazine; and translationally adjust magazine position in a second direction generally parallel to the label plane and generally perpendicular to the first direction.

5. A method as set forth in claim 1 in which the step of rotatably supporting the carrousel includes supporting the carrousel for rotation about a generally horizontal axis.

6. A method as set forth in claim 5 in which:

the step of providing an in-mold labeler includes supporting the in-mold labeler radially adjacent the mold station path; and the steps of moving the picker heads to their label deposition positions and removing the picker heads from their label deposition positions include moving the picker heads in respective directions generally parallel to a plane defined by the mold station path.

7. A method for inserting labels into open mold cavities of a rotary blow-molding apparatus, the method including the steps of:

providing a carrousel including at least two mold stations, each mold station including at least one mold cavity;

rotatably supporting the carrousel such that the mold stations are rotatable along a circular mold station path;

providing a parison-extrusion workstation adjacent the mold station path;

providing an article-release workstation spaced from the parison-extrusion workstation around the mold station path;

providing an in-mold labeler adjacent the mold station path between the article-release workstation and the parison-extrusion workstation, the in-mold labeler including at least two picker heads supported on a carriage, each picker head adapted to releasably grasp at least one label;

operatively connecting an indexer to the carrousel, the indexer adapted to pause the carrousel in a number of indexing positions;

moving the picker heads to respective label retrieval positions remote from the mold station path;

releasably grasping labels with the picker heads;

rotating the carrousel to position a first mold station adjacent the in-mold labeler with the first mold station mold cavity open;

pausing the carrousel with the first mold station positioned adjacent the in-mold labeler;

moving the picker heads to their label deposition positions within the mold station path and between parted halves of the mold cavity;

depositing the labels in respective mold cavity halves of one of the mold stations; and removing the picker heads from their label deposition positions.

8. A method as set forth in claim 7 further including the label position adjustment steps of:

providing a pair of label magazines supported adjacent the picker heads when the picker heads are in the label retrieval position;

providing individual magazine translational adjustment mechanisms;

operatively connecting each translational adjustment mechanism to one of the label magazines;

providing individual magazine rotational adjustment mechanisms;

operatively connecting each rotational adjustment mechanism to one of the label magazines; and adjusting the orientation of at least one of the label magazines by adjusting at least one of the translational and rotational adjustment mechanisms.

9. A method as set forth in claim 8 further including the label position adjustment steps of:

providing at least two pairs of label magazines supported adjacent the picker heads when the picker heads are in the label retrieval position;

providing individual magazine translational adjustment mechanisms and operatively connecting them to respective ones of the label magazines;

providing individual magazine rotational adjustment mechanisms and operatively connecting them to respective ones of the label magazines; and adjusting the orientation of at least one of the label magazines by adjusting at least one of the translational and rotational adjustment mechanisms.

10. A method as set forth in claim 8 in which the step of providing individual magazine translational adjustment mechanisms includes providing translational adjustment mechanisms configured to:

translationally adjust magazine position in a first direction generally parallel to a label plane defined by a label loaded in the magazine; and translationally adjust magazine position in a second direction generally parallel to the label plane and generally perpendicular to the first direction.

11. A method as set forth in claim 7 in which the step of providing a carrousel includes the step of providing mold stations on the carrousel that each include at least two mold cavities.

12. A method as set forth in claim 7 further including the additional step of repeating the label retrieval, label grasping, carrousel rotating, carrousel pausing, label insertion, label deposition, and picker head removal steps for a second carrousel mold station.

13. A method as set forth in claim 7 in which the step of rotatably supporting the carrousel includes supporting the carrousel for rotation about a generally horizontal axis.

14. A method as set forth in claim 13 in which:

the step of providing an in-mold labeler includes supporting the in-mold labeler radially adjacent the mold station path; and the steps of moving the picker heads to their label deposition positions and removing the picker heads from their label deposition positions include moving the picker heads in respective directions generally parallel to a plane defined by the mold station path.

* * * * *

UNITED STATES PATENT AND TRADEMARK OFFICE
CERTIFICATE OF CORRECTION

PATENT NO. : 6,193,925 B1
DATED : February 27, 2001
INVENTOR(S) : Lawrence H. Weber et al.

It is certified that error appears in the above-identified patent and that said Letters Patent is hereby corrected as shown below:

<u>Title page,</u>
Item [73], Assignee, please delete "UNOVA-R & B Machines Tool Co., Warren, Michigan" and insert therefor -- R & B Machine Tool Company, Saline, Michigan --.

Signed and Sealed this

Fourth Day of February, 2003

JAMES E. ROGAN
*Director of the United States Patent and Trademark Office*